Sept. 2, 1941.    M. OLLEY    2,254,491
MOTOR VEHICLE
Filed Aug. 2, 1933    2 Sheets-Sheet 1
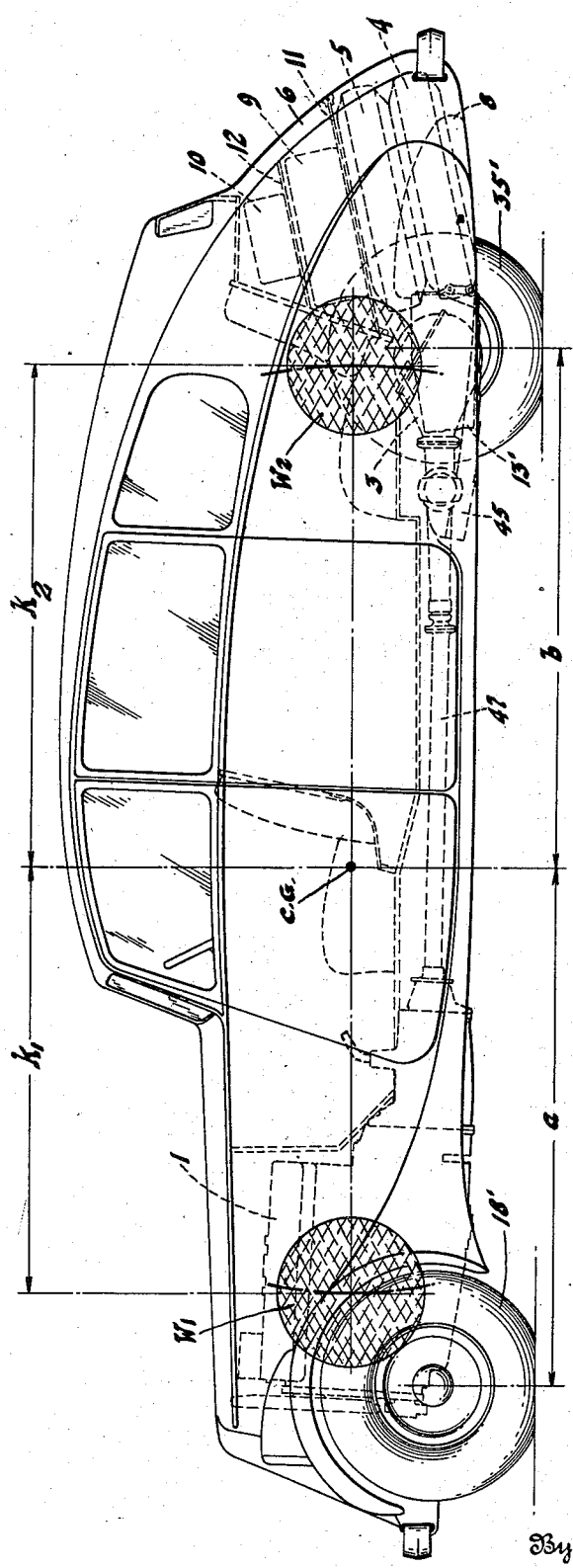
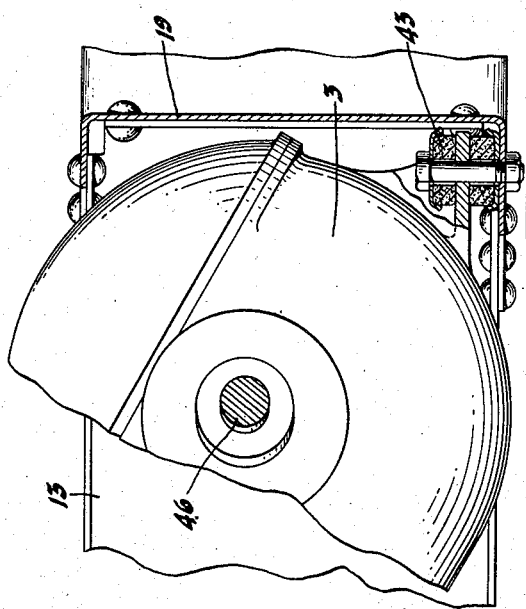
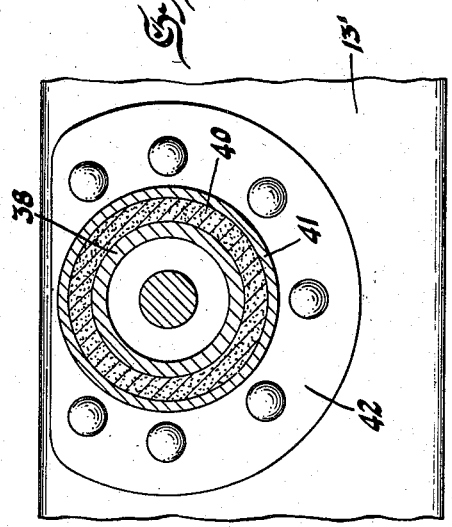
Inventor
Maurice Olley
By Blackmore, Spencer & Flint
Attorneys Sept. 2, 1941.     M. OLLEY     2,254,491
MOTOR VEHICLE
Filed Aug. 2, 1933     2 Sheets-Sheet 2

Inventor
Maurice Olley
By Blackmore, Spencer & Flint
Attorneys

Patented Sept. 2, 1941

2,254,491

UNITED STATES PATENT OFFICE 2,254,491

MOTOR VEHICLE

Maurice Olley, Pleasant Ridge, Mich., assignor to General Motors Corporation, Detroit, Mich., a corporation of Delaware Application August 2, 1933, Serial No. 683,239

1 Claim. (Cl. 180—1)

This invention relates to road vehicles and particularly to the riding comfort and "roadability" of motor vehicles.

The modern motor car is being run at increasingly high speeds over the highways and while the vehicle itself is capable of sustaining these high speeds, the actual riding comfort and the ease of handling leave much to be desired. The occupants are fatigued by the oscillations or what may be termed the "action" of the car with effects which are accentuated as the speed increases.

The conventional automobile has its framework together with its necessary mechanical parts so arranged and organized as to provide a body space thereon and the whole is then suspended on the wheels. Efforts to improve the riding comfort or "ride" and the ease of handling or stability on the road, or "roadability," have been largely directed to the suspension and almost entirely to the springs, their mountings, and means to modify the action of the springs.

The road shocks at the wheels of a motor vehicle acting through the springs, front and rear, result in oscillating motions of the vehicle body. The shocks may take place in any conceivable combination, under any or all of the road wheels separately or together but, as measured in a vertical longitudinal plane, (and it is the motion in such a plane with which this invention is concerned) the oscillations separately, simultaneously, or in any phase relationship always take place about two virtual but none the less definitely fixed transverse axes for any given vehicle and condition of loading.

While it has been appreciated heretofore that the oscillations were of the foregoing nature, the importance from the standpoint of "ride" of the frequencies of these oscillations and the particular location of the axes of oscillation relative to the motor vehicle and to one another has not been fully understood.

It is a common experience to find that a given automobile will, under certain and usually abnormal load conditions, have improved ride and roadability, but no automobile has heretofore been built in which the optimum value of all the considerations affecting ride and roadability, i. e. the distribution of the sprung masses, the position of the center of gravity, the ratio of the spring deflection front and rear, and the actual frequency of the oscillations, has been realized.

The general object of the invention is an automobile of improved riding comfort and road stability.

It is a specific object of the invention to ensure that the principal oscillations of the automobile body as a result of road shocks are of substantially equal frequency about determinate transverse axes.

It is a further object of the invention to secure the aforementioned objects with the best possible relationship between the principal factors controlling "ride" and "roadability" which are the position of the center of gravity, the actual and relative spring deflection of the front and rear end of the automobile, and the distribution of the sprung masses, which factors are interdependent, and to some extent, conflicting in their influence.

The above and other objects of the invention are achieved by arranging and disposing the essential parts and constituents of the sprung mass of the automobile so as in themselves to provide the best longitudinal distribution of the suspended masses relatively to the road wheel axes and then providing a suitable spring suspension so that the vehicle body will oscillate as closely as possible vertically up and down with combined oscillations of a comfortable frequency giving a so-called "flat ride," free from violent pitching.

Experiment and experience have shown that the "ride" of the car or the comfort of the passengers requires that the periodicity of oscillations of any kind and from any source should be within the range of 70 to 90 cycles per minute. Any other frequencies are liable to cause fatigue and discomfort.

The natural period or frequency of oscillation of a spring supported mass is a function of the spring deflection, which is measured as the amount by which the spring is compressed from a free to a fully loaded position.

It is known that in any car a spring deflection of 4½ inches (measured as the amount by which the suspended mass approaches the road wheel centers as the springs are compressed from their free position to that position assumed under normal full load) is the very least which can be used if the frequency is not to exceed 90 cycles per minute.

In any car, and irrespective of its size or weight, the spring deflection should therefore not be less than 4½ inches and only by using a suspension of not less than this deflection can objectionable higher frequency oscillations be avoided. This is at once a departure from standard present day practice as far as the front suspension is concerned.

The actual ride is affected not only by the frequency, but also by the "action" or type of oscillation which depends on the position of the transverse axes of oscillation.

The actual oscillations of an automobile are usually compounded of "pitch" which may be defined as an oscillation about a virtual axis always within the wheelbase, and "bounce" which may be defined as an oscillation about a virtual axis in front of or behind the automobile.

The farther these axes are removed from the axles, the more nearly is a so-called "flat ride" attained—the vehicle body moving vertically under road shocks while maintaining a position substantially parallel to the ground. Such a flat ride is free from the violent pitching or rocking motion which is so noticeable in conventional cars where the oscillations about the pitch axis located in the space between the two wheel axes and about the bounce axis located only a small distance in front of the front wheels, have a large horizontal force component which jerks the neck muscles of the passengers.

The fundamental relationship requirement for simple harmonic motion of a body about two different transverse axes is that $$\frac{k^2}{ab}$$

should equal unity where $k$ is the polar radius of gyration of the mass of the body about its center of gravity and $a$ and $b$ are the distances of the respective axes from the transverse vertical plane containing the center of gravity, and that at the same time the deflections of the supporting springs at either end of the body should be equal. Expressed otherwise, this means that when one axis is the center of percussion the other axis is the center of rotation or angular oscillation; or that any vertical blow in the plane of one axis will be without influence on the position of the body at the plane of the other axis.

Considering now a mass to be suspended on springs towards either end, the springs at each end being deflected an equal amount by the masses, the bounce axis will be at infinity and the pitch axis in the vertical plane of the center of gravity.

It might appear that an automobile should have a $$\frac{k^2}{ab}$$

ratio equal to unity with equal spring deflection front and rear since, when $$\frac{k^2}{ab}$$

equals unity and the front and rear spring deflections are equal, the frequencies in pitch and bounce are equal, and these are the only conditions in which the frequencies are equal. It is desirable that the frequencies of pitch and bounce should be reasonably close together since, to the extent that they are dissimilar, there may be very objectional interference or "heterodyne" effects between the oscillations of the pitch and bounce, producing sudden augmented impulses highly objectionable to the passengers.

When in an automobile the ratio $$\frac{k^2}{ab}$$

approaches unity, the oscillating axes approach the vertical planes of the axles; when so located neither of them are true pitch or bounce axes as defined above since they are neither within nor without the axles or wheelbase.

On the other hand, when the front and rear spring deflections are equal the bounce axis tends to be at infinity and the pitch axis in the vertical plane containing the center of gravity whatever the value of $$\frac{k^2}{ab}$$

may be.

The two conditions in combination are conflicting, and as a result the positions of the oscillating axes are indeterminate, the behavior and action of the car cannot be predicated and the riding sensations are unpleasant and disturbing, causing a feeling of insecurity to the driver or passengers. Thus, while an equal frequency of oscillation about either virtual axis is desirable, the question arises as to whether in actual fact the stability and predicated action and behavior of the car obtainable from fixed virtual centers of oscillation would not be more desirable, even at the expense of dissimilar frequencies in pitch and bounce provided these frequencies were so close that no distinct "interference kicks" occur.

It has been found that this is indeed the case and that by reducing the $$\frac{k^2}{ab}$$

ratio the frequencies in pitch and bounce are still so close that no distinct interference kicks occur while, however, the car has more nearly definite oscillation centers with a characteristic and determinate "action."

If now, $S_1$ = front spring stiffness in lbs. per inch deflection $S_2$ = rear spring stiffness in lbs. per inch deflection $w_1$ = pitch frequency in radians per second $w_2$ = bounce frequency in radians per second $M$ = mass of the vehicle $a$ = distance of front spring from vertical plane of center of gravity $b$ = distance of rear spring from vertical plane of center of gravity then with equal spring deflection front and rear $$\frac{S_1}{S_2}=\frac{b}{a}$$

$$S_1 a = S_2 b$$

$$S_1 = \frac{S_2 b}{a}$$

$$S_2 = \frac{S_1 a}{b}$$

With equal spring deflections front and rear, the bounce axis is at infinity and the pitch axis in the vertical plane of the center of gravity. The bouncing consists of pure linear oscillations, and the pitching consists of pure rotary oscillations. It can be shown that the square of the bounce frequency, $$w_2^2 = \frac{S_1 + S_2}{M}$$

and the square of the pitch frequency, $$w_1^2 = \frac{S_1 a^2 + S_2 b^2}{M k^2}$$

$$\therefore \frac{w_1^2}{w_2^2} = \frac{S_1 a^2 + S_2 b^2}{M k^2} \times \frac{M}{S_1 + S_2}$$

dividing numerator and denominator by $S_1$ $$\frac{w_1^2}{w_2^2} = \frac{1}{k^2}\left(a^2 + \frac{S_2 b^2}{S_1}\right) \times \frac{1}{1+\frac{S_2}{S_1}}$$

but $$S_1 = \frac{S_2 b}{a}$$

$$\therefore \frac{w_1^2}{w_2^2} = \frac{1}{k^2}\left(a^2 + \frac{S_2 b^2}{\frac{S_2 b}{a}}\right) \times \frac{1}{1+\frac{S_2}{\frac{S_2 b}{a}}}$$

$$= \frac{1}{k^2}\left(a^2 + \frac{S_2 b^2 \times a}{S_2 b}\right) \times \frac{1}{1+\frac{S_2 \times a}{S_2 b}}$$

$$= \frac{a^2 + ab}{k^2} \times \frac{1}{1+\frac{a}{b}}$$

$$= \frac{a^2 + ab}{k^2\left(1+\frac{a}{b}\right)} = \frac{ab}{k^2}$$

and $$\frac{w_1}{w_2} = \frac{\text{Pitch frequency}}{\text{Bounce frequency}} = \sqrt{\frac{ab}{k^2}}$$

Thus with $$\frac{k^2}{ab}$$

equal to .8 and equal spring deflection front and rear, the ratio $$\frac{\text{pitch frequency}}{\text{bounce frequency}} = \sqrt{\frac{ab}{k^2}} = \frac{9}{8}$$

approximately and the frequencies are sufficiently close while definite oscillation centers of pitch at the center of gravity and bounce at infinity have been obtained.

Still further modifying the foregoing conditions for riding comfort, it has been found that the ratio $$\frac{\text{rear spring deflection}}{\text{front spring deflection}}$$

equal to unity with virtual pitch axis at the center of gravity and virtual bounce axis at infinity, can with advantage be departed from to effect a change in the position of the oscillating centers towards increased actual comfort.

The virtual pitch axis will always lie between a transverse vertical plane containing the center of gravity and that road wheel axis which has the greater spring deflection, while the virtual bounce axis will be on that side of the transverse vertical plane containing the center of gravity away from the pitch axis. The virtual bounce axis moves from infinity towards one axle as the virtual pitch axis moves from the center of gravity towards the other axle. These movements of the virtual axes take place as the $$\frac{\text{rear spring deflection}}{\text{front spring deflection}}$$

departs from unity. Since, however, the ratio $$\frac{\text{rear spring deflection}}{\text{front spring deflection}}$$

will vary with the variable live load consisting of passengers and fuel load (which may be a considerable percentage of the total load), then in a car in which the passengers are grouped for the most part to one side of a transverse vertical plane containing the center of gravity, the pitching motion can be converted to a more nearly up and down motion of the passengers by bringing the axis of pitch to the other side of the center of gravity away from the passengers. This cannot be done, however, without bringing the bounce axis closer to the car on that side of the center of gravity away from the pitch axis. The effect is, however, to convert the passenger motion from a combination of bounce parallel to the ground and more or less fore and aft pitching motion, to a combination of bounce (a motion which, while not a parallel motion, is still about an axis some distance away from the car) and a pitching motion which is more nearly parallel or up and down, thus improving the combined effect towards an actual flatter or parallel combined motion, with a normal load.

If, in an actual car with the center of gravity approximately central the passengers are grouped towards the rear axle, the axis of pitch can be brought towards the front axle away from the center of gravity by increasing the deflection of the front springs, and it has been found that a ratio of $$\frac{\text{rear spring deflection}}{\text{front spring deflection}}$$

equal to .75 at light load up to 1.0 at maximum load gives probably the greatest over-all improvement.

A still further advantage results from the use of a greater front spring deflection, in that a force applied as by a bump to the front wheels will have a greater moment about the bounce axis than about the pitch axis. For this reason the initial movement will be practically pure bounce and the rear of the car will be lifted, thus softening the impact which is to follow as the rear wheels pass over the bump and also preparing the rear springs to receive this impact.

While in the foregoing it was assumed that the center of gravity of the suspended mass could be anywhere within the wheel base and it was only necessary that the masses should be so disposed as to have the required polar moment about a horizontal transverse axis through the center of gravity, the position of the center of gravity of the suspended mass influences the roadability and stability of the automobile considerably and a position approximately midway between front and rear axles is very necessary for stability on cambered roads and when cornering. This disposition is desirable also for equal division of the load between the wheels and, in any case, a forward center of gravity is likely to bring parking and traction difficulties while a rearward center of gravity is accompanied by skidding on turns.

It has been found best to obtain fixed and determinate centers of oscillation by making the ratio $$\frac{k^2}{ab}$$

less than unity rather than greater than unity because with the desired central position of the center of gravity relative to the axles there would have to be a mass concentration to the outside of the axles for $$\frac{k^2}{ab}$$

to be greater than unity; and in addition to there being a practical difficulty in obtaining such a mass disposition of the essential parts of the car, there is still another reason which makes a higher value of $$\frac{k^2}{ab}$$

undesirable, since it would mean increasing the moment of inertia of the suspended mass of the car about a vertical as well as a transverse axis through the center of gravity and this would make the car harder to turn as well as increasing the probability of skid on entering a turn.

The comparison between a conventional car and a car built according to the invention is as follows:

In the conventional car the ratio $$\frac{k^2}{ab}$$

equals about .6, the ratio $$\frac{\text{rear spring deflection}}{\text{front spring deflection}}$$

is greater than 1 and frequently 2 or 3 with an actual spring deflection of the front springs of less than 4 inches, and the center of gravity is approximately central. The result of these relationships is that the oscillations are of widely different frequency (the ratio pitch frequency to bounce frequency being commonly 3 or 4 to 2), the pitch center is located to the rear of the center of gravity (in the passenger space) and the bounce center is not far ahead of the front axle, while the actual periodicity of the pitch oscillations is considerably higher than the maximum permissible frequency for comfort of 90 cycles per minute. The oscillations are of an uncomfortable frequency; there are considerable "interference kicks" especially at the rear end due to the dissimilar frequencies of the component oscillations with resonance at some times greatly increasing their amplitude; the pitching oscillation about a center below the passengers has a large horizontal component which jerks the passengers' neck muscles; and the proximity of the bounce axis to the front axle means that vertical blows at the front wheels produce a motion almost the same as that about the pitch axis. The passengers are more or less violently disturbed.

In a car built according to the invention, the ratio $$\frac{k^2}{ab}$$

equals about .8, the ratio $$\frac{\text{rear spring deflection}}{\text{front spring deflection}} = .93$$

with an average spring deflection of 7 inches, and the center of gravity approximately central. The result of these relationships is that the oscillations are of a comfortable and closely similar frequency (the ratio pitch frequency to bounce frequency being approximately as 5 is to 6), the pitch center is forward of the center of gravity (away from the passengers who are grouped to the rear), and the bounce center is some distance to the rear of the vehicle. A distinct improvement in the "action" of the car is effected, a "flatter" ride is obtained with elimination of "interference kicks," the passengers are not jerked forward but are oscillated gently up and down at a comfortable frequency and are least discomfited by such an arrangement of the ratios of the factors involved and their relationship to one another, while at the same time the actual "roadability" or ease of handling with safety at all speeds has been improved.

The accompanying drawings show one way in which the required disposition of the parts and the masses is obtained in an actual automobile.

In the drawings

Figure 1 is a side elevation of an automobile built according to the invention and showing the disposition of the principal masses in dotted lines.

Figure 4 is an enlarged section on the line 4—4 of Figure 2.

Figure 5 is an enlarged, partly broken away, part-sectional view on line 5—5 of Figure 2.

Figures 2, 3:
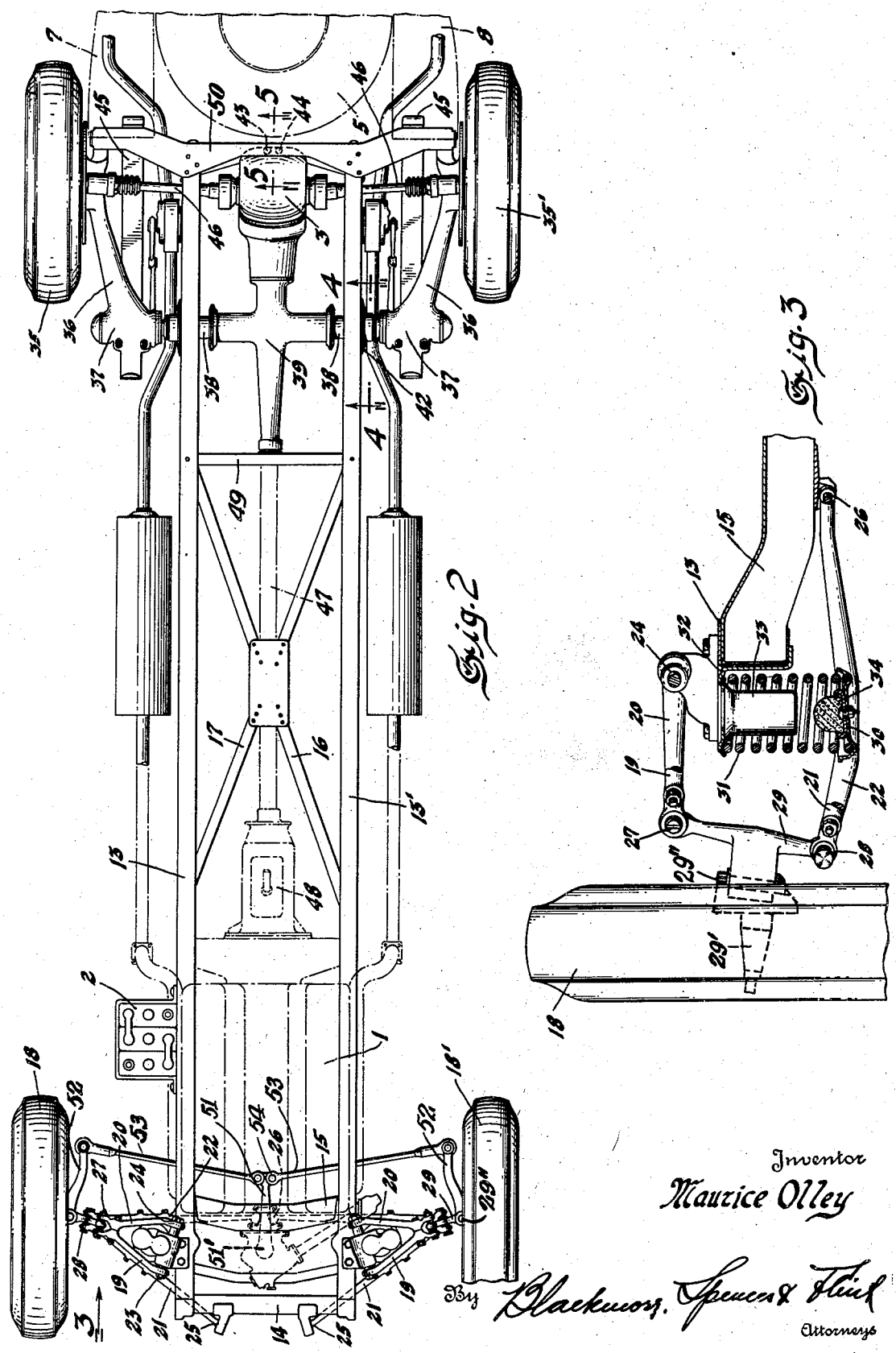
Figure 2 is a plan view of the chassis.
Figure 3 is an enlarged, partly broken away, part-sectional view in the direction of the arrow 3 of Figure 2 showing the way in which the front steering wheels are supported from the chassis.

The engine 1 is mounted farther forward in relation to the front axle and the car as a whole than is usual, and since such a forward disposition would interfere with the up and down movement of the ordinary front axle under spring deflection if the distance between the axle and the under side of the engine were not increased, it has been found convenient to adopt independent front wheel suspension. There is a further advantage in the adoption of independent suspension in that it readily permits of the use of the desired softer front springs. The use of independent suspension also increases the effective sprung masses at the ends of the car, thus increasing the moment of inertia of the sprung masses without necessarily increasing the moment of inertia of the car as a whole.

The battery 2 has been brought forward alongside the engine away from the usual position amidship of the car.

Since the requirements of the invention are concerned with the sprung mass, this has been increased at the rear by supporting the differential housing 3 on the frame.

Still further to increase the moment of inertia of the sprung masses while maintaining the approximately central center of gravity, the spare tires 4 and 5 with rims or wheels are carried in a boot 6 which is in an extension of the body to the rear of the frame. Also in the boot are two gasoline tanks 7 and 8, one on each side of the spare tires. A trunk 9 and tool box 10 are similarly carried in the boot on shelves 11 and 12.

The result of the foregoing distribution of the sprung masses is a mass concentration on each side of the center of gravity which is represented in Figure 1 by the two spheres $W_1$ and $W_2$. In this figure, $k$ represents the radius of gyration of these masses from the center of gravity G. $a$ and $b$ are the horizontal distances of the front and rear axles respectively from the transverse vertical plane of the center of gravity. The masses $W_1$ and $W_2$ have been represented as of unequal amount, unequal distances $k_1$ and $k_2$, respectively away from the center of gravity. It will be appreciated that they might be similar and hence a similar distance from the center of gravity. In any case, $k$ represents their mean distance from the center of gravity.

The frame is narrow and the side members 13 and 13' are parallel and substantially straight, providing a frame of high torsional rigidity with a low weight. Cross members 14, 15, 16, 17, 49, and 50 connect the side members. The members 16 and 17 form an X-member.

Each front wheel 18 or 18' is supported by a pair of swinging V-shaped supporting members or structures having two arms 19, 20 and 21, 22 respectively, pivoted to the chassis frame at points 23, 24 and 25, 26 respectively, and with link pins 27 and 28 at their apices carrying a king pin bracket piece 29 on which the wheel spindle 29' is pivotally supported.

The axes through 23, 24 and 25, 26 and the axes of the link pins 27 and 28 are all parallel to one another in their respective wheel supporting systems at an angle to the longitudinal axis of the frame diverging outwards towards the front end thereof. In addition, the forward ends of all the axes are tilted upwards away from the horizontal so that the axes lie in planes at right angles to the king pin 29" which is arranged to have the usual small "caster angle" as a result of which the front wheels are given a tendency to maintain themselves in a straight ahead position.

The upper member 19, 20 is considerably shorter than the lower member 21, 22. As a result, when these members swing about their pivots the "track" of the tires remains constant and the portion of the tire in contact with the road is not subjected to side thrusts or any scrubbing action.

A plate 30 is secured between the arms 21 and 22 of the lower wheel supporting member in such a way that the three together form a letter A, constituting a strong and rigid assembly well able to resist forces parallel to the ground occurring during the operation of the vehicle.

The plate 30 is formed to serve as a seat for a coil spring 31 which supports the frame, the upper end of the spring bearing on a bracket 32 fixed to the frame.

The spring reaction against the bracket 32 serves to clamp a cup shaped member 33 to the bracket, the member 33 serving as a stop to limit the deflection of spring 31. A rubber cushion 34 is attached to plate 30 to soften the blow.

The location of the plate 30 about three fifths of the distance from the axis 25, 26 to the pivot 28 permits the use of a very practical design of coil spring having such relative dimensions of wire diameter, coil diameter and operating length as to give a stable spring under its usual working deflection while at the same time permitting an extremely soft front suspension. The stiffness of the suspension at the front wheel will be $(3/5)^2$ or .36 of the spring stiffness.

The rear wheels 35 and 35' are mounted on bearings in turn supported by hollow hubs integral with lever arms 36 which have hollow hubs 37 supported on bearings on transverse tubular shafts 38 which are located forward of the wheels.

The differential housing 3 has attached to it a tubular cross shaped member 39 to which also are attached the tubular shafts 38. These tubular shafts 38 are mounted in rubber bushings 40 supported in bearings 41 through the frame side members 13 and 13' and provided with flanges 42 for attachment thereto.

The rear end of the differential housing is supported on the lower flange of the rear cross member 19 through two closely adjacent rubber cushions 43 and 44, the rubber bushings 40 for the tubular shafts 38 through the side members contituting the remaining two points of a virtual three point suspension for the assembly comprising the differential housing 3, the cross shaped member 39, and the tubular shafts 38, which assembly constitutes also a strong cross member on which the arms 36 are pivoted. In this way road shocks received by the rear wheels and also gear vibrations arising in the differential housing are resiliently cushioned from the frame by the rubber mountings.

Semi-cantilever leaf springs 45 are mounted on spring perches on the hubs 37 of lever arms 36. These leaf springs extend rearwards beyond the rear wheels and have their outer ends shackled to brackets on the rear cross member 19.

The mounting of the pivot points for the arms 36 for the rear road wheels forward of the wheels causes a tendency for the rear end of the chassis to be depressed by braking reaction when the brakes are applied. Any such depression is in opposition to the tendency of a vehicle to pitch or rock forward about a horizontal transverse axis when the brakes are applied. This latter tendency is more pronounced when the "softer" front springs necessary for a good ride are adopted and hence the greater desirability for the tendency towards depression of the rear end under braking reaction in a car built according to the invention.

The drive from the differential housing to the rear wheels is taken through universal and telescopic joints by the drive shafts 46.

Mounted in the longitudinal branches of the tubular cross shaped member 39 is a drive shaft for the pinion of the ring gear in the differential housing. This drive shaft is mounted in suitable bearings and universally jointed to the propeller shaft 47, which is universally jointed to the tail shaft of the transmission 48.

Dirigible movement of the road wheels 18 and 18' is effected through a steering lever 51 turning about a vertical axis 51' on the vehicle frame and actuated in any suitable manner through a steering gear and connections to a conventional steering wheel (not shown). Each wheel spindle 29' is provided with a steering arm 52. The steering arms are connected to the steering lever by a pair of tie rods 53 having ball and socket joint connections with the steering arms and the steering lever at 54. The tie rods 53 are pivoted to the steering lever at points which in the normal position of the parts are substantially in alignment with the pivot axes 25, 26 of each wheel supporting means so that the steering arrangement will be substantially unaffected by rising and falling movements of the wheels.

I claim:

In a power driven vehicle the combination comprising a frame, a vehicle wheel, a wheel carrier, a pair of links for connecting the wheel carrier to the frame pivotally connected at one end to said frame one above the other so as to be capable of swinging only in a vertical plane about parallel axes fixed with respect to the frame but incapable of movement relatively to the frame in any other direction, said links being pivotally connected to the wheel carrier to form with the wheel carrier and the frame an articulated quadrilateral, and a frictionless helical compression spring interposed between one of said links and the frame so as to oppose the vertical swinging motion of the links, said spring being freely movable laterally substantially over its entire length and being secured against lateral displacement at its ends with respect to the frame and the link, respectively.

MAURICE OLLEY.